US008821663B2

(12) United States Patent
Rose et al.

(10) Patent No.: US 8,821,663 B2
(45) Date of Patent: Sep. 2, 2014

(54) BALLISTIC RESILIENT RUN-FLAT TIRE, KIT AND METHOD THEREOF

(75) Inventors: Robert P. Rose, Chattanooga, TN (US); Larry R. Carapellotti, Mission Viejo, CA (US); Joseph M. Campo, Stow, OH (US)

(73) Assignee: Arnco, South Gate, CA (US)

(*) Notice: Subject to any disclaimer, the term of this patent is extended or adjusted under 35 U.S.C. 154(b) by 240 days.

(21) Appl. No.: 13/405,753

(22) Filed: Feb. 27, 2012

(65) Prior Publication Data

US 2013/0220507 A1    Aug. 29, 2013

(51) Int. Cl.
*B29D 30/06*    (2006.01)
*B29C 45/00*    (2006.01)

(52) U.S. Cl.
USPC .................. 156/110.1; 156/245; 264/501

(58) Field of Classification Search
USPC ................. 156/110.1, 245; 264/501
See application file for complete search history.

(56) References Cited

U.S. PATENT DOCUMENTS

| 4,081,429 A | 3/1978 | Wyman et al. |
| 6,187,125 B1 | 2/2001 | Rustad et al. |
| 6,508,898 B1 | 1/2003 | Rustad et al. |
| 6,629,550 B2 | 10/2003 | Rustad et al. |
| 2009/0062425 A1 | 3/2009 | Lucka et al. |

FOREIGN PATENT DOCUMENTS

| CH | 272454 | * 12/1950 |
| DE | 884290 | * 7/1953 |
| GB | 288040 | * 3/1928 |

* cited by examiner

*Primary Examiner* — Justin Fischer
(74) *Attorney, Agent, or Firm* — Ladas & Parry LLP

(57) ABSTRACT

A ballistic resilient run-flat tire device, kit and method for manufacturing the same are presented for providing a vehicle a capability of traveling for at least 30 miles at 30 miles per hour, after the device has been compromised as of result of exposure due to ballistic ordinance rifle shots such as 7.62×39 mm and 7.62×54 R or air loss from road hazard punctures. The device includes a tire carcass and a polyurethane inner coating inside the tire carcass that defines an inflatable hollow chamber within the ballistic resilient run-flat tire. The tire carcass has an annular tread, sidewalls, and beads. The polyurethane inner coating inside the tire carcass defining a hollow chamber provides additional protection along the sidewalls and tread of the tire carcass. The kit includes the un-interconnected elements of the device. The method includes the steps of curing, discharging, filling, injecting, introducing, mounting, obtaining, and preparing.

5 Claims, 2 Drawing Sheets

BALLISTIC RESILIENT RUN-FLAT TIRE, KIT AND METHOD THEREOF

FIELD OF THE INVENTION

The present invention relates to run-flat tires, and more particularly to a ballistic resilient run-flat tire capable of traveling for a relatively long distance after having been compromised.

BACKGROUND

The pneumatic tire has proven to be a preferred means of realizing a comfortable ride on any number of vehicles, such as bicycles, automobiles, trucks, and aircraft. However, pneumatic tires by their very nature are prone to becoming flat. In urban driving conditions, flats are usually brought about by excessive wear or some sort of puncture injury. Ordinarily a flat usually means stopping the vehicle and fixing or replacing the flat. In more challenging road conditions, such as those encountered in combat situations, stopping the vehicle to subsequently fix or replace a flat may not be an option and a more viable option is to simply drive away from the threat zone so that the compromised tire can be subsequently fixed or replaced in relative safety.

A tire capable of safely running over a certain distance without losing its ability to bear the load of the vehicle even if internal air pressure of the tire is reduced due to being compromised is understood to be a run-flat tire. It is preferable that when the run-flat tire is not compromised, i.e., inflated, then it should not overheat and not unnecessarily strain the suspension. It is also preferable in the event that the run-flat tire is compromised, i.e., deflated, it is able to withstand the load of the vehicle by being sufficiently flexible so that it does not strain the vehicle suspension providing a relatively comfortable ride while maintaining continuity at the bead seat/rim interface. This continuity must be maintained to prevent the tire from coming off the rim and stopping the vehicle.

Solid polyurethane tires have been used in industrial applications including forklift drive/load wheels and in off-the-road applications in the construction, lawn/garden and ground support equipment industry. Other polyurethane tire construction variants are used on wheelchairs, bicycles and in like wheel applications. However, solid polyurethane tires have proven to be not entirely satisfactory because they do not exhibit adequate cushioning and their handling characteristics are oftentimes not desirable. Solid polyurethane tires also suffer from unacceptable internal heat build-up and subsequently are prone to degradation during prolonged vehicle high speed service conditions.

An example of a disclosure for producing deflation proof pneumatic tires from a variety of compositions can be found in U.S. Pat. No. 6,629,550 which is incorporated by reference herein.

Pneumatic tires on combat vehicles can be flattened by any number of different ways, e.g., spikes, rifle shots, and improvised explosive devices (IEDs). It is preferable to design tires for combat vehicles so that they are at least resilient against being immediately disabled. A ballistic resilient run-flat tire would allow the injured combat vehicle to either maneuver into a defense position or to exit the threat zone.

Beyond the dangers of IEDs, combat vehicles, are also vulnerable by being stuck within a combat zone due to their tires being flattened by calibers such as 7.62-39 mm and 7.62×54 R rifle shots.

Accordingly, a ballistic resilient run-flat tire would be a desirable combat or law enforcement vehicle feature providing the tire could allow a vehicle to rapidly speed away with a complete loss of tire air pressure (e.g., 30 mph) from the threat to a considerable safe location (e.g., at least 30 miles).

Accordingly, a need exists for a ballistic resilient run-flat tire capable of traveling for a relatively long distance for at least 30 miles away from the ballistic incident site.

SUMMARY OF THE INVENTION

The present device, kit and method of using, according to the principles of the present invention, overcomes a number of the shortcomings of the prior art by providing a novel ballistic resilient run-flat tire device, kit and method for use in being capable of traveling for a relatively long distance for at least 30 miles away from where the ballistic resilient run-flat tire was compromised. The device includes a tire carcass and a polyurethane inner coating inside the tire carcass that defines a hollow pressurized chamber within the ballistic resilient run-flat tire. The tire assembly can also incorporate a CTIS (central tire inflation system) without compromising the system.

The kit includes the un-interconnected elements of the device. The kit can also include a tire liner, such as, Quik-Gel™ and a liquid sealant-such as, Reseal TV™. Reseal TV™ is a liquid sealant that will seal punctures up to one quarter inch. When the puncture occurs the liquid is pressed by air pressure into the hole and it forms a matrix of fiber and particles to seal it. the material is put in at $1/8$ to $1/16$ inch coverage dependent on whether tire is on road or off road and primarily only covers the tread and shoulder area. QuikGel™ Tire liner is a polyurethane material that is centrifugally cast into a tire or tube of a tire at $3/8$ths to $1/2$ inch thickness. It cures out and stays in place. As the puncture occurs the very elastomeric material seals around the intruding object and if removed pulls back or snaps back to close the hole. It is capable of sealing $1/4$ inch holes.

The method includes the steps of curing, discharging, filling, injecting, introducing, mounting, obtaining, and preparing.

In view of the foregoing disadvantages inherent in the known type run-flat tire devices now present in the prior art, the present invention provides an improved ballistic resilient ballistic resilient run-flat tire device which is not anticipated, rendered obvious, suggested, or even implied by the prior art, either alone or in any combination thereof.

To attain this, the present invention essentially comprises a tire carcass and a polyurethane inner coating. The tire carcass comprises an annular tread, a pair of sidewalls respectively extending radially inwardly from opposite sides of the tread; and beads embedded in radially inner ends of the sidewalls. The polyurethane inner coating is positioned inside the tire carcass which defines a pressurized hollow chamber within the ballistic resilient run-flat tire that allows the tire to maintain pressure and pneumatic tire characteristics until challenged with a puncture of some type.

There has thus been outlined, rather broadly, the more important features of the invention in order that the detailed description thereof that follows may be better understood, and in order that the present contribution of the art may be better appreciated.

The invention may also include an optional antiballistic panel in which the optional antiballistic panel may be mounted between the tire carcass and the polyurethane inner coating or embedded within the polyurethane inner coating.

BRIEF DESCRIPTION OF THE DRAWINGS

The invention will be better understood and aspects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
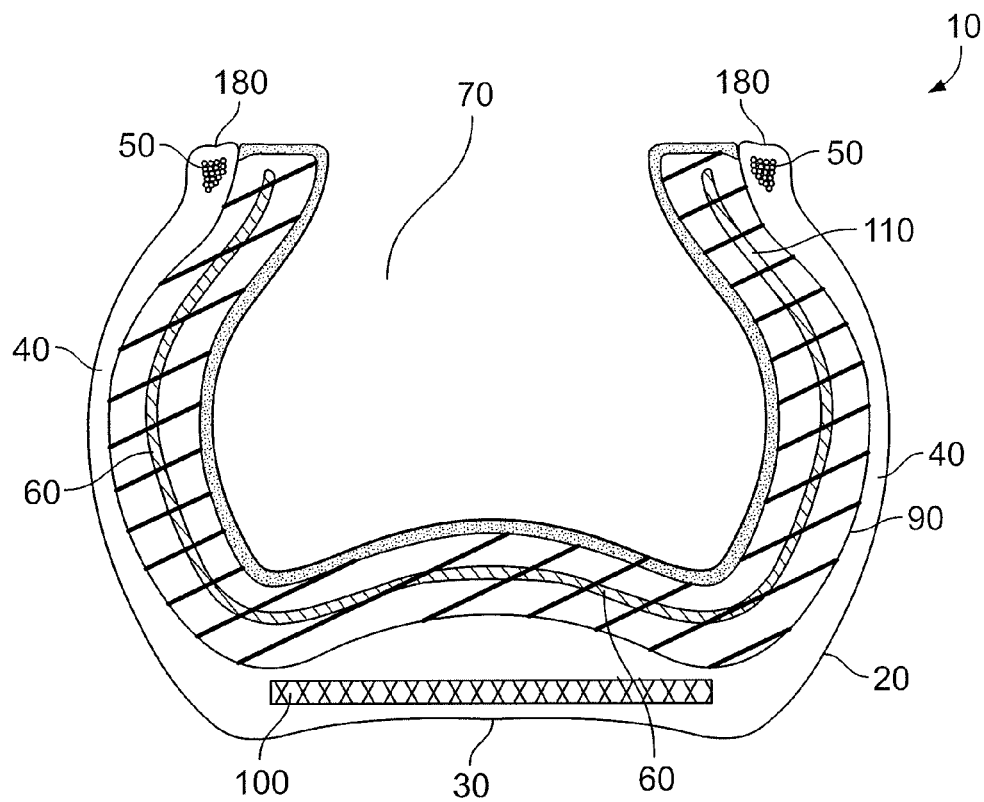
FIG. 1 is a cross sectional view of an embodiment of the ballistic resilient run-flat tire device constructed in accordance with the principles of the present invention.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. These exemplary embodiments will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. It will be understood that when a layer is referred to as being "on" another layer or substrate, it can be directly on the other layer or substrate, or intervening layers may also be present. In the drawings, it is understood that like reference numerals denote like elements. It is also understood that the drawings are not necessarily to scale and in some instances proportions may have been exaggerated in order to more clearly depict certain features of the invention.

Further, it should be understood that, although steps of various the claimed method may be shown and described as being in a sequence or temporal order, the steps of any such method are not limited to being carried out in any particular sequence or order, absent an indication otherwise. That is, the claimed method steps are to be considered to be capable of being carried out in any sequential combination or permutation order while still falling within the scope of the present invention.

Figure 2:
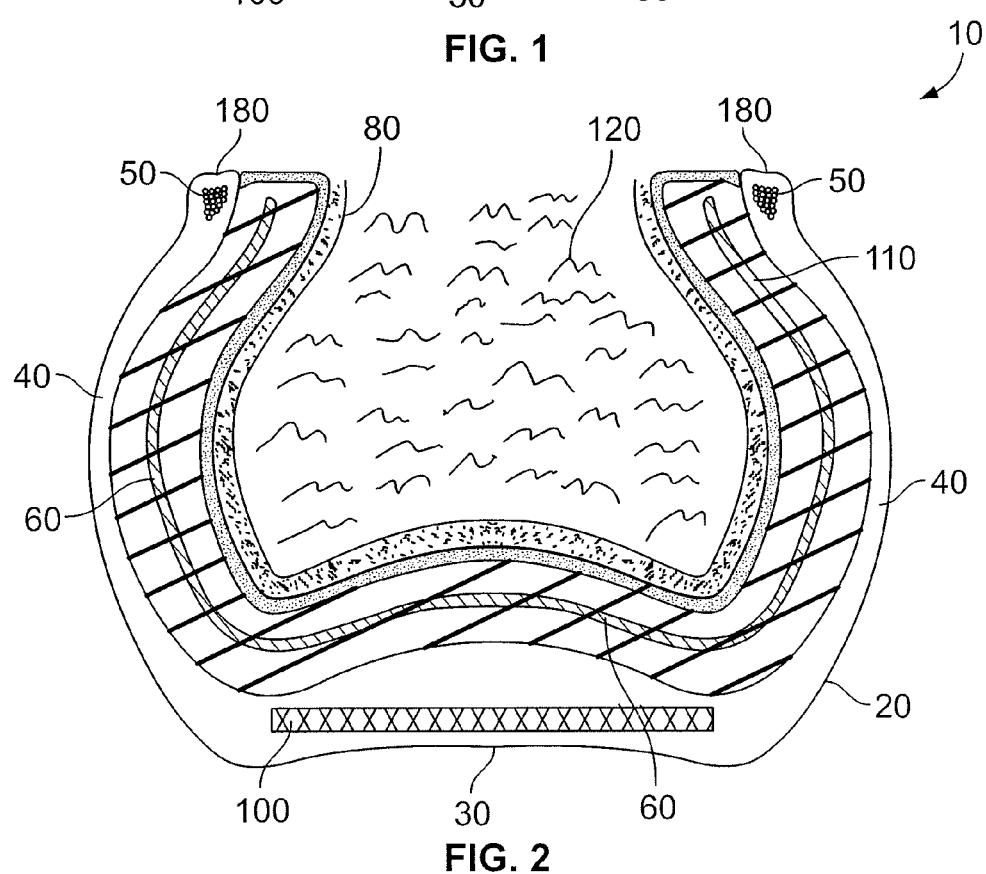
FIG. 2 is a cross sectional view of another embodiment of the ballistic resilient run-flat tire device of the present invention.
Figure 3:
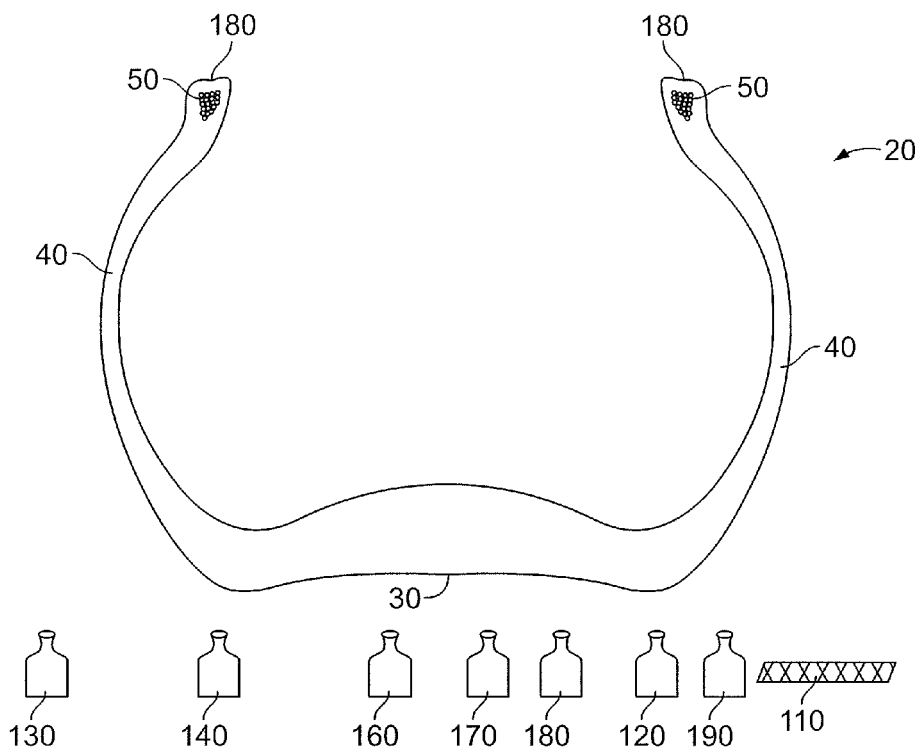
FIG. 3 is a cross sectional view of the kit of the present invention.

Referring now to the FIGS. 1-3, one embodiment of the ballistic resilient run-flat tire 10 is envisioned to comprise a tire carcass 20, a polyurethane inner coating 60, and an inner bladder 80. The tire carcass 20 comprises an annular tread 30, a pair of sidewalls 40 respectively extending radially inwardly from opposite sides of the tread 30; and beads 50 embedded in radially inner ends 180 of the sidewalls 40. The polyurethane inner coating 60 is positioned inside the tire carcass 20 which defines a hollow pressurized chamber 70 within the ballistic resilient run-flat tire 10. The inner bladder 80 is disposed within the hollow chamber 70 of the ballistic resilient run-flat tire 10. To achieve pressure, the device uses standard air fittings to the inner bladder 80.

The ballistic resilient run-flat tire 10 may also comprise an optional antiballistic panel 110. The optional antiballistic panel 110 may be mounted between the tire carcass 20 and the polyurethane inner coating 60. Alternately the antiballistic panel 110 may be embedded within the polyurethane inner coating 60. The antiballistic panel 110 may be made of any known type of antiballistic material such as those selected from the group consisting of para-aramid fiber, meta-aramid fiber, graphite or carbon fiber, mineral fiber, polyacrylate fiber, cellulosic fiber, nylon fiber and combinations thererof. One preferred embodiment of the antiballistic material is that it is made of a para-aramid fiber that comprises fibers of copoly-p-phenylene-3,4'-oxydiphenylene terephthalamide or poly-p-phenylene terephthalamide.

The polyurethane inner coating 60 comprises a polymerization condensate of a polyisocyanate and a polyalcohol. The polyisocyanate may be any polyisocyanate which can be used as a constituent for making polyurethane such as those polyisocyanates selected from the from the group consisting of 1-isocyanato-3,3,5-trimethyl-5-isocyanatomethylcyclohexane, 1-isocyanato-3-isocyanatomethyl-3,5,5,-trimethylcyclohexane, 2-methyl-1,5-pentane diisocyanate, 2-methylpentamethylene diisocyanate, 3-chlorotrimethylenediisocyanate, 4-chloro-1,3-phenylene diisocyanate, 4-methoxy-m-phenylenediisocyanate, 4-phenoxy-m-phenylenediisocyanate, 5-Methylnonamethylene diisocyanate, 1,2-butylene diisocyanate, 1,2-propylene diisocyanate, 1,3-cyclohexene diisocyanate, 1,3-cyclohexyl diisocyanate, 1,3-propylene diisocyanate, 1,3-xylene diisocyanate, 1,4-bisisocyanatomethylcyclohexane, 1,4-butylene diisocyanate, 1,4-cyclohexane diisocyanate, 1,4-cyclohexene diisocyanate, 1,4-diisocyanatocyclohexane, 1,4-napthalenediisocyanate, 1,4-phenylene diisocyanate, 1,4-tetramethylene diisocyanate, 1,4-xylene diisocyanate, 1,5-naphthalene diisocyanate, 1,5-tetrahydronaphthylene diisocyanate, 1,6-hexane diisocyanate, 1,6-hexamethylene diisocyanate, 1,8-napthylenediisocyanate, 1,10-decamethylene diisocyanate, 1,12-dodecyldiisocyanate, 2,2'-Methylene diphenyl diisocyanate, 2,3-dimethyltetramethylenediisocyanate, 2,6-naphthylenediisocyanate, 2,4-diphenylhexane-1,6-diisocyanate, 2,4'-methylene diphenyl diisocyanate, 2,4-toluene diisocyanate, 2,6-toluene diisocyanate, 3,3'-dimethyl-4,4'-diisocyanatodicyclohexylmethane, 3,3'-dimethyl-4,4'-diphenyl diisocyanate, 3,3'-dimethoxybenzidine-4,4'-diisocyanate, 4,2'-diisocyanatodicyclohexylmethane, 4,4'-methylene dicyclohexyl diisocyanate, 4,4'-diphenylmethane diisocyanate, 4,4'-bisphenylene diisocyanate, 4,4-butyl-m-phenylenediisocyanate, 2,2,4-trimethylhexa-1,6-diyldiisocyanate, 2,2,4-trimethylhexamethylene diisocyanate, 2,2,4-trimethyl-1,6-diisocyanatohexane, bis(4-isocyanatocyclohexyl) methane, benzenedisulfonyl isocyanate, 2,2',5,5'-tetramethyl-4,4'-diphenylisopropylidene diisocyanate, benzophenone-4,4'-diisocyanate, dibenzoyl isocyanate, carbonic diisocyanate, cumene-1,4-diisocyanate, decamethylene-diisocyanate, dimeryl diisocyanate, diphenylmethane diisocyanate, dodecamethylene diisocyanate, durene-diisocyanate, ethylene, diisocyanate, hexanedioyl diisocyanate, hexamethylene diisocyanate, isophorone diisocyanate, lysine diisocyanate, methylene diisocyanate, methylene-p-phenylene diisocyanate, methylene bis(2-methyl-p-phenylene) diisocyanate, pentamethylene, diisocyanate, m-phenylene diisocyanate, p-phenylene diisocyanate, nonamethylene, diisocyanate, norbornyl diisocyanate, stilbene-4,4'-diisocyanate, tetramethylene diisocyanate, trimethylenediisocyanate, toluene diisocyanate, m-xylylene diisocyanate, p-xylylene diisocyanate, and combinations thereof. Likewise, the polyalcohol may be any polyalcohol which can be used as a constituent for making polyurethane such as those polyalcohols selected from the group of 1,1,1-trimethylol propane, 1,1,1-trimethylol ethane, 1,2,3-trimethylol propane, and pentaerythritol, 1,3 propane diol, 1,3 butylene diol, 1,6-hexanediol di-pentaerythritol, 2,2'-oxybis(methylene)bis(2-ethyl-1,3-propanediol), ethylene glycol, propylene glycol, bisphenol-A, hydrogenated bisphenol-A, trimethylolpropane, trimethylol-ethane, pentaerythritol, glycerin, neopentyl glycol, cyclohexane dimethanol, 2-methyl-1,3-propanediol, di-ethylene glycol, tri-ethylene glycol, polythylene glycol, polypropylene glycol, polybutylene glycol, polyhexylene glycol, polyhexandiol glycol, polyether polyalcohols, and combinations thereof.

The polyurethane inner coating 60 may also optionally be made from an optional cross-linking agent selected from the group consisting of dicumyl peroxide, di-t-butyl peroxide, 1,3-bis(tert-butylperoxyisopropyl)benzene, n-butyl 4,4'-di (tert-butylperoxy)valerate and 2,5-dimethyl-2,5-di(tert-butylperoxy)hexane, a methacrylic acid higher ester, triallyl isocyanurate, metal salt of methacrylic acid or acrylic acid, diallyl phthalate ester, and 1,2-polybutadiene, and combinations thereof.

The polyurethane inner coating 60 may also optionally be made from an optional curing agent selected from the group consisting of 2,4-di(methylthio)-meta-phenylenediamine, 4,6-di(methylthio)-meta-phenylenediamine, 2,4-di(ethylthio)-meta-phenylenediamine, 4,6-di(ethylthio)-meta-phenylenediamine, 2,4-di(n-butylthio)-meta-phenylenediamine, 2,5-di(methylthio)-meta-phenylenediamine, 2-(methylthio)-4-(ethylthio)-meta-phenylenediamine, 3,5-di(methylthio)-2,4-diaminotoluene, 3,5-di(ethylthio)-2,4-diaminotoluene, 3,5-di(methylthio)-2,6-diaminotoluene, 3,5-di(propylthio)-2,4-diaminotoluene, 3-(methylthio)-5-(ethylthio)-2,4-diaminotoluene, 3,5-di(methylthio)-2,4-diamino-ethylbenzene, 3,5-di(ethylthio)-2,6-diamino-ethylbenzene, 3,5-di(cyclohexylthio)-2,4-diaminotoluene, 3-(methylthio)-5-(propylthio)-2,6-diamino-ethylbenzene, 3,5-di(methylthio)-2,4-diamino-chlorobenzene, 3,6-di(ethylthio)-2,4-diamino-chlorobenzene, 4,4'-methylenebis[2,6-di(methylthio) aniline], [3,5-di(methylthio)-4-aminophenyl[3-(methylthio-4-aminophenyl]methane, 4,4'-ethylidenebis[2,6-di (ethylthio)aniline], 4,4'-isopropylidenebis[2,6-di (methylthio)aniline], [3,5-di(methylthio)-4-aminophenyl] [3-5-di(ethylthio)-4aminophenyl]sulfide, phenyl[3,5-di (methylthio)-2,4-diaminophenyl]methane, 2,6-diamino-3,5-di(n-butylthio-4-bromotoluene, [3,5-di(methylthio)-4-aminophenyl][3,5-di(ethylthio)-4aminophenyl]ether, 3,5-(methylthio)-2,6-diaminotoluene, 3,5-di(methylthio)-2,6-diaminotoluene, di-cumyl peroxide; tert-butyl cumyl peroxide; 2,5-dimethyl-2,5 bis(tert-butyl peroxy)hexyne-3; bis(tert-butyl peroxy isopropyl)benzene; 4,4-di-tert-butyl peroxy n-butyl valerate; 1,1-di-tert-butylperoxy-3,3,5-trimethylcyclohexane; bis-(tert-butyl peroxy)-diisopropyl benzene; tert-butyl perbenzoate; di-tert-butyl peroxide; 2,5-dimethyl-2,5-di-tert-butylperoxide hexane, polyaspartic esters, ketimines, aldimines, and combinations thereof.

The polyurethane inner coating 60 may also optionally comprise any number of additional constituents such as those selected from the group consisting of polyisoprene, natural rubber, ethylene-propylene copolymers, ethylene-propylene-diene terpolymers, polysulfide polymers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, and combinations thereof.

The tire carcass 20 may further comprise a reinforcing belt 100. The reinforcing belt 100 may be made of any reinforcing material such as those selected from the group consisting of ceramic fiber, banite steel, boron carbide, silicon carbide, and combinations thereof.

The ballistic resilient run-flat tire 10 may also comprise an optional liquid sealant 180, such as Reseal TV™ introduced within the inner bladder 80. Reseal TV™ is a liquid sealant that will seal punctures up to one quarter inch. When the puncture occurs the liquid is pressed by air pressure into the hole and it forms a matrix of fiber and particles to seal it. The Reseal TV™ material is put in at ⅛ to 1/16 inch coverage dependent on whether tire is on road or off road and primarily only covers the tread and shoulder area. The liquid sealant 180 may contain a Kevlar™ particles and rubber dust suspended in the liquid introduced within the inner bladder 80.

The ballistic resilient run-flat tire 10 may also comprise an optional thermally cured liner 190 introduced within the inner bladder 80. The liner 190, such as QuikGel™ may preferably be a soft polyurethane, e.g., a superorthodic cured polyurethane gel material, exhibiting a low hardness property and having an elongation index of at least 1500% for skin resealing. QuikGel™ is a polyurethane material that is centrifugally cast into a tire or tube of a tire at ⅜ths to ½ inch thickness. It cures out and stays in place. As the puncture occurs the very elastomeric material seals around the intruding object and if removed pulls back or snaps back to close the hole. It is capable of sealing ¼ inch holes.

A kit is also envisioned for making the ballistic resilient run-flat tire 10 in which the kit can include any of the following constituents such as those including the tire carcass 20, the inner bladder 80, a polyisocyanate mixture 130, a polyalcohol mixture 140, a cross linking mixture 160, a curing agent mixture 170, a sealant 180, a liquid liner 190, and an antiballistic panel 110. The tire carcass 20 comprises an annular tread 30, a pair of sidewalls 40 respectively extending radially inwardly from opposite sides of the tread 30, and beads 50 which are embedded in the radially inner ends 180 of the sidewalls 40. The inner bladder 80 is configured to be disposed within the hollow chamber 70 so that the polyurethane slurry (made from at least the polyisocyanate mixture 130 and the polyalcohol mixture 140) can then be injected between the tire carcass 20 and the inner bladder 80 so that it can provide additional protection and additional support around the inner bladder 80 and the tire carcass 20, especially along the sidewalls 40 and the annular tread 30.

The polyisocyanate mixture 130 contains a polyisocyanate such as those selected from a group consisting of 1-isocyanato-3,3,5-trimethyl-5-isocyanatomethylcyclohexane, 1-isocyanato-3-isocyanatomethyl-3,5,5,-trimethylcyclohexane, 2-methyl-1,5-pentane diisocyanate, 2-methylpentamethylene diisocyanate, 3-chloro-trimethylenediisocyanate, 4-chloro-1,3-phenylene diisocyanate, 4-methoxy-m-phenylenediisocyanate, 4-phenoxy-m-phenylenediisocyanate, 5-Methylnonamethylene diisocyanate, 1,2-butylene diisocyanate, 1,2-propylene diisocyanate, 1,3-cyclohexene diisocyanate, 1,3-cyclohexyl diisocyanate, 1,3-propylene diisocyanate, 1,3-xylene diisocyanate, 1,4-bisisocyanatomethylcyclohexane, 1,4-butylene diisocyanate, 1,4-cyclohexane diisocyanate, 1,4-cyclohexene diisocyanate, 1,4-diisocyanatocyclohexane, 1,4-napthalenediisocyanate, 1,4-phenylene diisocyanate, 1,4-tetramethylene diisocyanate, 1,4-xylene diisocyanate, 1,5-naphthalene diisocyanate, 1,5-tetrahydronaphthylene diisocyanate, 1,6-hexane diisocyanate, 1,6-hexamethylene diisocyanate, 1,8-napthylenediisocyanate, 1,10-decamethylene diisocyanate, 1,12-dodecyldiisocyanate, 2,2'-Methylene diphenyl diisocyanate, 2,3-dimethyltetramethylenediisocyanate, 2,6-naphthylenediisocyanate, 2,4-diphenylhexane-1,6-diisocyanate, 2,4'-methylene diphenyl diisocyanate, 2,4-toluene diisocyanate, 2,6-toluene diisocyanate, 3,3'-dimethyl-4,4'-diisocyanatodicyclohexylmethane, 3,3'- dimethyl-4,4'-diphenyl diisocyanate, 3,3'-dimethoxybenzidine-4,4'-diisocyanate, 4,2'-diisocyanatodicyclohexylmethane, 4,4'-methylene dicyclohexyl diisocyanate, 4,4'-diphenylmethane diisocyanate, 4,4'-bisphenylene diisocyanate, 4,4-butyl-m-phenylene-diisocyanate, 2,2,4-trimethylhexa-1,6-diyldiisocyanate, 2,2,4-trimethylhexamethylene diisocyanate, 2,2,4-trimethyl-1,6-diisocyanatohexane, bis(4-isocyanatocyclohexyl) methane, benzenedisulfonyl isocyanate, 2,2',5,5'-tetramethyl-4,4'-diphenylisopropylidene diisocyanate, benzophenone-4,4'-diisocyanate, dibenzoyl isocyanate, carbonic diisocyanate, cumene-1,4-diisocyanate, decamethylene-diisocyanate, dimeryl diisocyanate, diphenylmethane diisocyanate, dodecamethylene diisocyanate, durene-diisocyanate, ethylene, diisocyanate, hexanedioyl diisocyanate, hexamethylene diisocyanate, isophorone diisocyanate, lysine diisocyanate, methylene diisocyanate, methylene-p-phenylene diisocyanate, methylene bis(2-methyl-p-phenylene) diisocyanate, pentamethylene, diisocyanate, m-phenylene diisocyanate, p-phenylene diisocyanate, nonamethylene, diisocyanate, norbornyl diisocyanate, stilbene-4,4'-diisocyanate, tetramethylene diisocyanate, trimethylenediisocyanate, toluene diisocyanate; m-xylylene diisocyanate, p-xylylene diisocyanate, and combinations thereof.

The polyalcohol mixture 140 contains a polyalcohol such as those selected from the group of 1,1,1-trimethylol propane, 1,1,1-trimethylol ethane, 1,2,3-trimethylol propane, and pentaerythritol, 1,3 propane diol, 1,3 butylene diol, 1,6-hexanediol di-pentaerythritol, 2,2'-oxybis(methylene)bis(2-ethyl-1,3-propanediol), ethylene glycol, propylene glycol, bisphenol-A, hydrogenated bisphenol-A, trimethylolpropane, trimethylol-ethane, pentaerythritol, glycerin, neopentyl glycol, cyclohexane dimethanol, 2-methyl-1,3-propanediol, di-ethylene glycol, tri-ethylene glycol, polythylene glycol, polypropylene glycol, polybutylene glycol, polyhexylene glycol, polyhexandiol glycol, polyether polyalcohols, and combinations thereof.

The cross linking mixture 160 contains a cross linking agent such as those selected from the group consisting of dicumyl peroxide, di-tert-butyl peroxide, 1,3-bis(tert-butylperoxyisopropyl)benzene, n-butyl 4,4'-di(tert-butylperoxy) valerate and 2,5-dimethyl-2,5-di(tert-butylperoxy)hexane, a methacrylic acid higher ester, triallyl isocyanurate, metal salt of methacrylic acid or acrylic acid, diallyl phthalate ester, and 1,2-polybutadiene, and combinations thereof.

The curing agent mixture contains a curing agent such as those selected from the group consisting of 2,4-di(methylthio)-meta-phenylenediamine, 4,6-di(methylthio)-meta-phenylenediamine, 2,4-di(ethylthio)-meta-phenylenediamine, 4,6-di(ethylthio)-meta-phenylenediamine, 2,4-di(n-butylthio)-meta-phenylenediamine, 2,5-di(methylthio)-meta-phenylenediamine, 2-(methylthio)-4-(ethylthio)-meta-phenylenediamine, 3,5-di(methylthio)-2,4-diaminotoluene, 3,5-di(ethylthio)-2,4-diaminotoluene, 3,5-di(methylthio)-2,6-diaminotoluene, 3,5-di(propylthio)-2,4-diaminotoluene, 3-(methylthio)-5-(ethylthio)-2,4-diaminotoluene, 3,5-di(methylthio)-2,4-diamino-ethylbenzene, 3,5-di(ethylthio)-2,6-diamino-ethylbenzene, 3,5-di(cyclohexylthio)-2,4-diaminotoluene, 3-(methylthio)-5-(propylthio)-2,6-diamino-ethylbenzene, 3,5-di(methylthio)-2,4-diamino-chlorobenzene, 3,6-di(ethylthio)-2,4-diamino-chlorobenzene, 4,4'-methylenebis[2,6-di(methylthio) aniline], [3,5-di(methylthio)-4-aminophenyl[3-(methylthio)-4-aminophenyl]methane, 4,4'-ethylidenebis[2,6-di(ethylthio)aniline], 4,4'-isopropylidenebis[2,6-di(methylthio)aniline], [3,5-di(methylthio)-4-aminophenyl] [3-5-di(ethylthio)-4aminophenyl]sulfide, phenyl[3,5-di(methylthio)-2,4-diaminophenyl]methane, 2,6-diamino-3,5-di(n-butylthio-4-bromotoluene, [3,5-di(methylthio)-4-aminophenyl][3,5-di(ethylthio)-4aminophenyl]ether, 3,5-(methylthio)-2,6-diaminotoluene, 3,5-di(methylthio)-2,6-diaminotoluene, di-cumyl peroxide, tert-butyl cumyl peroxide, 2,5-dimethyl-2,5 bis(tert-butyl peroxy)hexyne-3, bis(tert-butyl peroxy isopropyl)benzene, 4,4-di-tert-butyl peroxy N-butyl valerate, 1,1-di-tert-butylperoxy-3,3,5-trimethylcyclohexane, bis-(tert-butyl peroxy)-diisopropyl benzene, tert-butyl perbenzoate, di-tert-butyl peroxide, 2,5-dimethyl-2,5-di-tert-butylperoxide hexane, polyaspartic esters, ketimines, aldimines, and combinations thereof.

The antiballistic panel 110 may be made of antiballistic material such as those selected from the group consisting of para-aramid fiber, meta-aramid fiber, graphite or carbon fiber, mineral fiber, polyacrylate fiber, cellulosic fiber, nylon fiber and combinations thererof.

A method of making a ballistic resilient run-flat tire 10 is also envisioned which comprises the steps of curing, discharging, filling, injecting, introducing, mounting, obtaining, and preparing. The obtaining step comprise obtaining a tire carcass 20 comprising: an annular tread 30; a pair of sidewalls 40 respectively extending radially inwardly from opposite sides of the tread 30; and beads 50 embedded in radially inner ends 180 of the sidewalls 40. The mounting step comprises mounting the inner bladder 80 within the tire carcass 20 and then filling the inner bladder 80 with liquid to a specified size. The preparing step comprises preparing a polyurethane slurry by mixing a polyisocyanate mixture 130 with a polyalcohol mixture 140. Preparing the polyurethane slurry may further comprise mixing a cross linking mixture 160 and a curing agent into the polyurethane slurry. The introducing step comprises introducing an antiballistic panel 110 between the tire carcass 20 and the mounted inner bladder 80. The injecting step comprises injecting the polyurethane slurry between the tire carcass 20 and the mounted inner bladder 80 so that a thickness of the polyurethane slurry between the tire carcass 20 and the mounted inner bladder 80 at least one inch thick. The curing step comprises curing the injected polyurethane slurry to form a polyurethane inner coating 60 having a side thickness of at least one inch between the sidewall of the tire carcass 20 and that of the mounted inner bladder 80 and bottom thickness of at least one inch between the tread 30 of the tire carcass 20 and that of the mounted inner bladder 80. The discharging step comprises discharging the fluid 120 from the mounted inner bladder 80 after the polyurethane slurry is cured.

The method may also include a step of pressurizing the emptied inner bladder with a gas after discharging the fluid 120 from the mounted inner bladder 80. Preferably the gas is air, however, alternate gasses such as nitrogen, argon, helium and admixtures are also envisioned.

The method may also optionally include the optional steps of adding an aliquot of a sealant 180 into the emptied inner bladder after discharging; and pressuring the inner bladder with a gas, such as air, nitrogen, helium, argon, and admixtures thereof.

The method may also optionally include the optional steps of dispensing an aliquot of a liquid liner 190 into the empty inner bladder after discharging; subsequently curing the liner 190 within the inner bladder; and then pressuring the inner bladder with a gas, such as air, nitrogen, helium, argon, and admixtures thereof.

Referring now to FIG. 1, a stylized cross sectional view of one embodiment of the ballistic resilient run-flat tire 10 is depicted. The tire carcass 20 is also shown having the annular tread 30, the pair of sidewalls 40, and the beads 50. Even though the optional reinforcing belt 100 is shown embedded within the tire carcass 20 adjacent to the annular tread 30, it is understood that the optional reinforcing belt 100 can also be embedded within the tire carcass 20 adjacent to the sidewalls 40. The optional antiballistic panel 110 is also shown embedded within the polyurethane inner coating 60. It is also understood that the optional antiballistic panel 110 can be positioned between the tire carcass 20 and the polyurethane inner coating 60. The polyurethane inner coating 60 is shown positioned inside the tire carcass 20 so that the polyurethane inner coating 60 defines a hollow chamber 70 within the ballistic resilient run-flat tire 10. This hollow chamber 70 can be used to accommodate the inner bladder 80 (not shown) filled with fluid 120 (not shown) when the ballistic resilient run-flat tire 10 is being manufactured. The inner chamber/bladder 80 is filled with a gas such as air when the ballistic resilient run-flat tire 10 is being used on a vehicle.

FIG. 2 depicts a stylized cross sectional view of another embodiment of the ballistic resilient run-flat tire 10. The tire carcass 20 is shown comprising the annular tread 30, the pair of sidewalls 40, the beads 50 and the optional reinforcing belt 100. The antiballistic panel 110 is shown embedded within the polyurethane inner coating 60. The inner bladder 80 is shown filled with fluid 120 in which the fluid 120 filled inner bladder 80 is shown mounted within the polyurethane inner coating 60, i.e., the hollow chamber 70 (not shown), which in turn is shown within the tire carcass 20.

FIG. 3 depicts is a stylized view of one embodiment of the kit for manufacturing the ballistic resilient run-flat tire 10. The kit can contain any number of the various components such as the tire carcass 20, the fluid 120, the polyisocyanate mixture 130, the polyalcohol mixture 140, the cross linking mixture 160 and the antiballistic panel 110. It is also understood that the kit for manufacturing the ballistic resilient run-flat tire 10 will include the inner bladder 80 (not shown) which is configured to be disposed within the hollow chamber 70 (not shown).

Referring now to Table 1 (below), the results are summarized of a temperature profile as a function of time for a test run on a ballistic resilient run-flat tire 10. The ballistic resilient run-flat tire 10 was initially pressurized to approximately 44 pounds per inch and then subjected to continuous load ranging between 1400 to 2120 pounds for successive 8 hour periods. The particular ballistic resilient run-flat tire 10 used in this test run had a P275/65R18 carcass tire size with two ply sidewalls and 5 ply treads. The pressurized ballistic resilient run-flat tire 10 was run for a total of 47 hours in which approximately every 8 hours the temperature was measured and recorded. A rotation corresponding to approximately 55 mph was maintained for the 47 hour duration with a 3 minute initial warm up at 30 mph which corresponded to a total simulated distance traveled of 2585 miles.

TABLE 1

Variable loading affects

| Time period | External load pressure | Beginning Temp | Ending Temp |
|---|---|---|---|
| 0 hrs to 8 hrs | 1400 pounds | 98° F. | 130° F. |
| 8 hrs to 16 hrs | 1760 pounds | 130° F. | 123° F. |
| 16 hrs to 24 hrs | 1760 pounds | 123° F. | 145° F. |
| 24 hrs to 32 hrs | 2120 pounds | 145° F. | 130° F. |
| 32 hrs to 40 hrs | 2120 pounds | 130° F. | 136° F. |
| 40 hrs to 47 hrs | 2120 pounds | 136° F. | 161° F. |

In this test, air was not removed from the tire in order to determine the feasibility of our concept design, i.e., the internal pressurization was maintained to about 44 pounds per inch. The tested tire ran with no difficulties the entire 47 hours and gave surprising temperature values of less than 170° F. That is, the measured temperatures below 170° F. were remarkable because temperatures as high as 280° F. to 300° F. can be reached on more standard designed tire designs subjected to similar distances, speeds and loads.

After the first test, ballistics tests was performed on another inflated tire 10 having a P275/65R18 carcass tire size with two ply sidewalls and 5 ply treads. After five rounds of 7.62-54 projectiles were fired through the tire 10, the tire was inspected and dissected after the ballistics tests. The bullets penetrated through the tire but did not substantially adversely affected the integrity of the tire other than releasing the internal pressurization.

Figure 4:
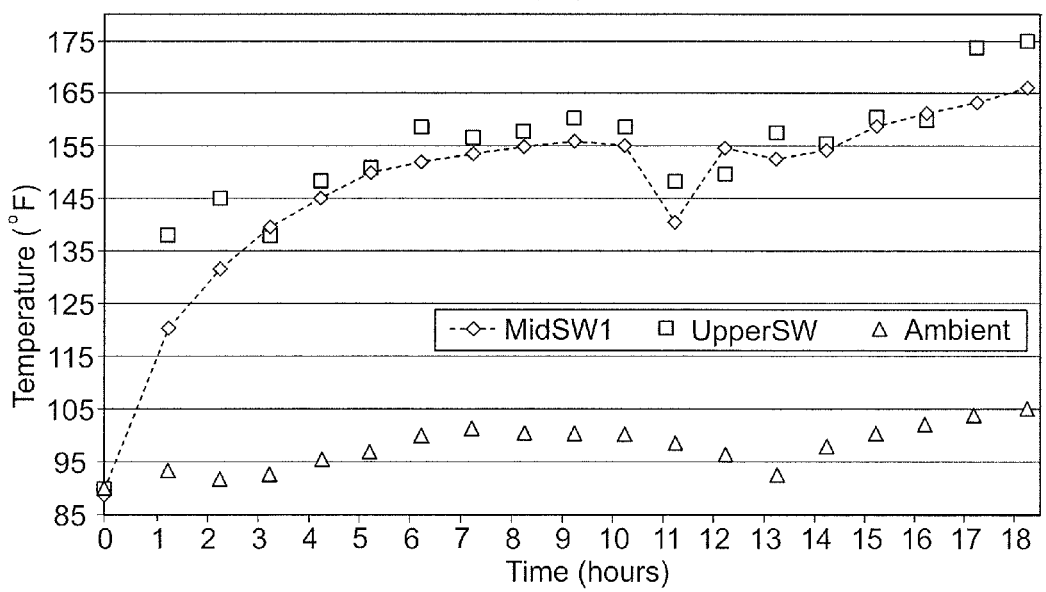
FIG. 4 is a temperature profile as a function of time for a ballistic resilient run-flat tire device of the present invention.

Referring now to FIG. 4 which depicts results of yet another long distance endurance test run on a ballistic resilient run-flat tire 10. In this particular test, the ballistic resilient run-flat tire 10 was maintained at 30 mph at no internal pressurization. At the very beginning of the test, the ballistic resilient run-flat tire 10 was initially pressurized to approximately 44 pounds per inch and then subjected to a continuous 2000 pound load for approximately 15 minutes at 30 mph. After the initializations under pressurized conditions, the valve core was removed and the ballistic resilient run-flat tire 10 was allowed to become un-pressurized. Subsequently to un-pressurization, the tested ballistic resilient run-flat tire 10 was subjected to a constant 30 mph at a test load of 2000 pounds for 1 hour periods. The tested ballistic resilient run-flat tire 10 used in this test run was another P275/65R18 carcass tire size with two ply sidewalls and 5 ply treads. A rotation corresponding to approximately 30 mph was maintained throughout the complete test and the test achieved a total simulated distance traveled of 540 miles un-pressurized conditions. After an initial 15 minute conditioning, the ballistic resilient run-flat tire 10 was then subsequently subjected to a series of one hour exposure periods in which after each exposure period the temperature and deflection/footprint were measured and recorded. As a result of this long distance endurance test the ballistic resilient run-flat tire 10 achieved a total mileage of 547.5 miles driven at 30 miles per hour in which 540 miles were un-pressurized. The footprint/deflection was measured within 5¼ to 5⅜ inches and therefore did not vary significantly. It is understood within the art of tire manufacturing that the footprint/deflection data can allow manufacturers to estimate guidelines on wear, traction, fuel economy, etc.

The results of this un-pressurized test depicted in Table 2 and FIG. 5 on this tire test were found to be excellent and exceeded expectations. They ran at 30 mph at 2000 pound hydraulic loading on the 67 inch road wheel. At the end of each hour, the rotation was stopped and various measurements such as deflection, footprint, and temperature values at two points (mid sidewall and sidewall just below the tread area) were recorded. It is believed that at the mid sidewall (MidSW1) and upper sidewall (UpperSW) just below the tread area are the two most vulnerable areas due to the flexing which build up heat. In a regular product tire, the heat buildup occurs first in the center core of the tire and radiates out until the tire fails.

This test subjected the tire to run for 18+ hours before being shut down. The MidSW1 and UpperSW temperatures never exceeded 175° F. test during the test that lasted over 540 miles. Since polyurethanes are typically touted to be of functionally used from between −40° F. to 280° F., then it was concluded that the tire far exceeded the targeted goal of driving a distance of 30 miles at 30 mph and a 2000 pound load.

This 30 mile distance is believed to be sufficiently long distance to allow a vehicle to escape from the harmful environment.

An actual off-road test was performed on the tested ballistic resilient run-flat tire 10 in an unpressurized condition when the valve stem was removed. The ballistic resilient run-flat tires 10 used in this off-road test were P275/65R18 carcass tire size with two ply sidewalls and 5 ply treads. This off-road test comprised removing the valve stems, due to an obstruction and mounting two tires 10 on the rear of the off-road vehicle (a Toyota Tundra™, a full-size pickup truck). Footprints were performed before and during the test as well as deflections. This test subjected the tires 10 to approximately 100 total miles and included average speeds of 30 mph while periodically subjecting the tires to upper speeds of 60 to 65 mph for a short spans of time. The off-road vehicle with the two un-pressurized rear tires 10 were driven on paved and unpaved roads with few red lights and little traffic in a pristine natural setting. The natural setting provided a number of hills, turns, mud puddles, and railroad tracks, in which the tires 10 displayed no detectable problems. Since the valve stems were removed, then the tires 10 were un-pressurized and still provided the off-road vehicle a comfortable ride by deflecting, absorbing, and releasing energy during the different phases of testing. The temperature was measured on the outside of the tires with the majority of the time staying in the 68° F. to 78° F. area. Only after running at 65 mph, on a nearby non park area, did the tire 10 temperature rise up to around 98° F. for a short period of time. After this off-road test the tires 10 were removed and originals placed in position and truck was returned. An important side note is that one of the tires 10 used in this off-road test was also the same tire 10 that was previously tested for the 18 one hour sessions with no air pressure at 30 mph. As a result this particular tire 10 essentially achieved 540 miles under full load of 2000 lbs prior to subjecting it to the additional 100 miles in the off-road test.

As to the manner of usage and operation of the present invention, the same should be apparent from the above description. Accordingly, no further discussion relating to the manner of usage and operation will be provided.

Those skilled in the art will appreciate that the invention described herein is susceptible to variations and modifications other than those specifically described. It is to be understood that the invention includes all such variations and modification which fall within its spirit and scope. The invention also includes all of the steps, features, compositions and compounds referred to or indicated in this specification, individually or collectively, and any and all combinations of any two or more of said steps or features.

What is claimed is:

1. A method of making a ballistic resilient run-flat tire comprising:
    obtaining a tire carcass comprising:
        an annular tread;
        a pair of sidewalls respectively extending radially inwardly from opposite sides of the tread; and
        beads embedded in radially inner ends of the sidewalls;
    mounting an inner bladder within the tire carcass;
    filling the inner bladder with a fluid;
    priming the tire carcass with a primer;
    preparing a polyurethane slurry by mixing a polyisocyanate mixture with a polyalcohol mixture;
    introducing an antiballistic panel between the tire carcass and the mounted inner bladder;
    injecting the polyurethane slurry between the tire carcass and the mounted inner bladder so that a thickness of the polyurethane slurry between the tire carcass and the mounted inner bladder at least one inch thick;
    curing the injected polyurethane slurry to form a polyurethane inner coating having a side thickness of at least one inch between the sidewall of the tire carcass and that of the mounted inner bladder and bottom thickness of at least one inch between the tread of the tire carcass and that of the mounted inner bladder; and
    discharging the fluid from the inner bladder.

2. The method of claim 1, further comprising pressurizing the emptied inner bladder with a gas after discharging.

3. The method of claim 1, further comprising:
    adding an aliquot of a sealant into the empty inner bladder after discharging; and
    pressuring the inner bladder with a gas.

4. The method of claim 1, further comprising
    dispensing an aliquot of a liquid liner into the empty inner bladder after discharging;
    curing the liquid liner within the inner bladder; and
    pressuring the inner bladder with a gas.

5. The method of claim 1, wherein preparing the polyurethane slurry further comprises mixing a cross linking mixture and a curing agent into the polyurethane slurry.

* * * * *